(12) United States Patent
Ebina

(10) Patent No.: US 12,541,469 B2
(45) Date of Patent: Feb. 3, 2026

(54) ELECTRONIC CONTROL UNIT AND ACCESS CONTROL METHOD

(71) Applicant: Hitachi Astemo, Ltd., Hitachinaka (JP)

(72) Inventor: Tomohito Ebina, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 50 days.

(21) Appl. No.: 18/722,020

(22) PCT Filed: Dec. 24, 2021

(86) PCT No.: PCT/JP2021/048336
§ 371 (c)(1),
(2) Date: Jun. 20, 2024

(87) PCT Pub. No.: WO2023/119652
PCT Pub. Date: Jun. 29, 2023

(65) Prior Publication Data
US 2025/0068725 A1 Feb. 27, 2025

(51) Int. Cl.
*G06F 12/14* (2006.01)
*G06F 21/55* (2013.01)
*G06F 21/56* (2013.01)

(52) U.S. Cl.
CPC .......... *G06F 12/14* (2013.01); *G06F 12/1458* (2013.01); *G06F 21/554* (2013.01); *G06F 21/566* (2013.01)

(58) Field of Classification Search
CPC .... G06F 12/14; G06F 12/1458; G06F 21/554; G06F 21/566
See application file for complete search history.

(56) References Cited

U.S. PATENT DOCUMENTS

| | | | |
|---|---|---|---|
| 10,621,340 B2 * | 4/2020 | White | G06F 21/57 |
| 2012/0072669 A1 * | 3/2012 | Nishiguchi | G06F 12/1027 |
| | | | 711/135 |
| 2015/0199514 A1 * | 7/2015 | Tosa | G06F 21/53 |
| | | | 726/17 |
| 2023/0289204 A1 * | 9/2023 | Ismael | H04L 63/20 |
| 2023/0290193 A1 * | 9/2023 | Kashani | G06F 21/554 |

FOREIGN PATENT DOCUMENTS

JP 2018-018274 A 2/2018

* cited by examiner

*Primary Examiner* — Shirley X Zhang
(74) *Attorney, Agent, or Firm* — Foley & Lardner LLP

(57) ABSTRACT

An electronic control unit includes: a processor that executes a program; a memory that is enabled to be accessed by the processor; an access violation detection mechanism that monitors an access from the processor to the memory; and a time storage mechanism that stores detection time at which an access violation is detected by the access violation detection mechanism, in which the processor stores switching time at timing at which a task being executed is switched, the time storage mechanism stores the time at which the access violation is detected, and the processor identifies a task having caused the access violation by comparing the switching time and the detection time.

11 Claims, 5 Drawing Sheets

ELECTRONIC CONTROL UNIT AND ACCESS CONTROL METHOD

TECHNICAL FIELD

The present invention relates to a computing technique for a vehicle control unit, and more particularly to a technique for controlling accesses to a memory or an input/output device.

BACKGROUND ART

In microcomputers incorporated in recent electronic control units (ECUs), processing anomalies resultant of unauthorized accesses caused by bugs, flaws, or the like in the program are detected by setting memory access privileges, and detecting privilege violations.

Furthermore, a hypervisor and virtual machines (a technique for making it appear to an internal program that the microcomputer is occupied by itself) are used for integrating ECUs with different functions to one ECU, so that, by restarting or stopping the virtual machine where an unauthorized access is detected, failsoft for suppressing propagation of failure can be implemented.

Still furthermore, a security infringement in a zone-ECU, which manages the communication on the vehicle, can result in serious problems in the vehicle control. Therefore, when an unauthorized access is detected, it is necessary to take safety measures such as shutting down the communication of the entire ECU.

A related art example in this technical field is disclosed in the following literature. According to PTL 1 (JP 2018-18274 A), an electronic control unit includes a microcomputer that prohibits an access to a memory area outside of the area where accesses are permitted, as a violating access, and that includes a memory protection unit configured to generate a memory protection violation interrupt in response to a violating access. The microcomputer then counts the number of violating accesses, and disables the memory protection violation interrupt when the count becomes equal to or more than a predetermined number. Once the memory protection violation interrupt is disabled, it becomes possible to continue execution of the program without terminating the current process or restarting the OS. In this case, according to the disclosure, the protection by the memory protection unit is maintained, so that the electronic control unit can continue execution of the program, safely.

CITATION LIST

Patent Literature

PTL 1: JP 2018-18274 A

SUMMARY OF INVENTION

Technical Problem

In recent microcomputers, command sets are simplified by handling a control register of an input/output device as one type of memory. However, because there is a large discrepancy between the processing speeds of the CPU of the microcomputer and the input/output device, it is not efficient to keep the CPU waiting for the completion of an access to the low-speed control register. Therefore, it is preferable to store the data in a buffer, and to keep CPU its operation, while allowing the input/output device to perform its process, asynchronously with the CPU, by referring to the data in the buffer.

In many cases, the access violation detection mechanism in a microcomputer is caused to operate when the CPU accesses the data bus, so that, upon detecting an access violation, it is possible to generate an interrupt and to notify the OS of the violation without delay.

Because the control register of the input/output device, too, is a type of memory, the access violation detection mechanism described above can also detect an access violation in the control register. However, because there is an upper limit in the number of memory areas that can be set to the access violation detection mechanism in the CPU, the input/output device are often set either to entirely prohibit or permit accesses thereto.

For the purpose of protecting the input/output device even when the accesses to the control register are entirely permitted, there are also some microcomputers with a configuration in which an access violation detection mechanism is also provided to the input/output device. In such a microcomputer, because the input/output device is accessed via a buffer, the timing at which the input/output device detects an access privilege violation may be different from the timing at which the CPU executes the process having caused the violation. In other words, when the CPU is notified of a detection of a privilege violation via an interrupt, the CPU may have already started executing another process by the timing at which the interrupt is processed.

Furthermore, CPU are generally prohibited from accepting any interrupt while executing a process requiring consistency, and therefore, detections of an interrupt may introduce a delay. This delay becomes more prominent in the OS that manages a plurality of tasks. That is, while an OS switches between tasks, interrupts are generally prohibited in order to maintain the consistency of management information internal of the OS. Hence, even if an access privilege violation is detected, the process subsequent to the detection is put behind until the interrupt prohibition is lifted. This delay may therefore lead to an error in the determination as to which task has made the privilege violation.

The present invention has been made to solve the problem described above, and an object of the present invention is to determine the task having caused a privilege violation, correctly.

Solution to Problem

A representative example of the invention disclosed in the present application is as follows. That is, an electronic control unit includes: a processor that executes a program; a memory that is enabled to be accessed by the processor; an access violation detection mechanism that monitors an access from the processor to the memory; and a time storage mechanism that stores detection time at which an access violation is detected by the access violation detection mechanism, in which: the processor stores switching time at timing at which a task being executed is switched; the time storage mechanism stores time at which the access violation is detected; and the processor identifies a task having caused the access violation by comparing the switching time and the detection time.

Advantageous Effects of Invention

According to one aspect of the present invention, it is possible to determine the task having become the cause of a privilege violation, correctly. Problems, configurations, and effects other than those described above will be become clear from the following description of embodiments.

DESCRIPTION OF EMBODIMENTS

Embodiments of the present invention will now be described with reference to drawings.

First Embodiment

Figure 1:
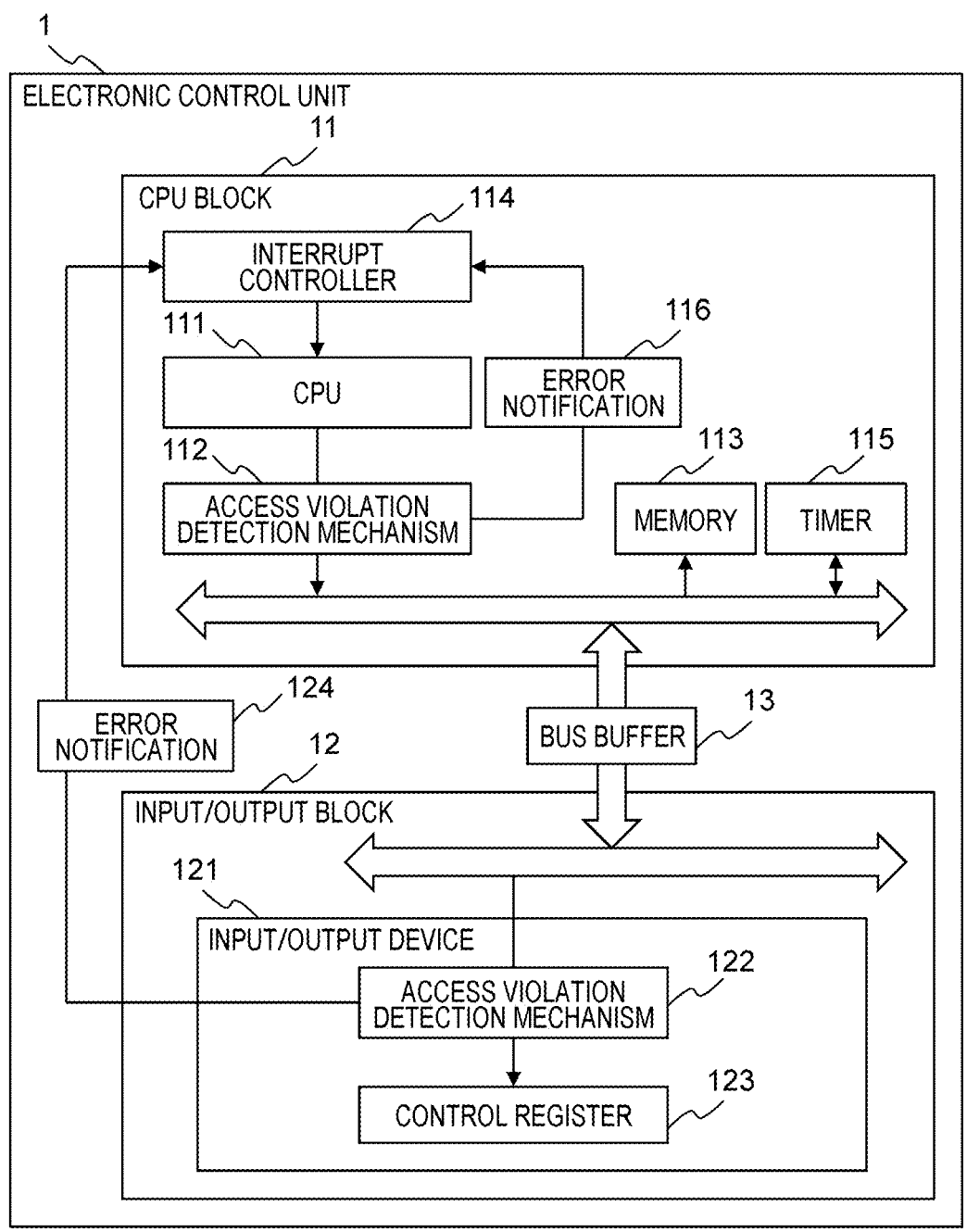
FIG. 1 is a configuration diagram of an electronic control unit according to a first embodiment.

FIG. 1 is a configuration diagram of an electronic control unit 1 according to a first embodiment.

Described in this embodiment is a method for generating an interrupt as an error notification when an access violation to a memory or an input/output device is detected.

This electronic control unit 1 is a vehicle control unit suitable for an installation on a vehicle, and includes a CPU block 11 and an input/output block 12. The CPU block 11 and the input/output block 12 are connected via a bus buffer 13. The bus buffer 13 absorbs the discrepancy in the data transmission/reception speed between the CPU block 11 and the input/output block 12.

The CPU block 11 includes a CPU 111 that processes operations, an access violation detection mechanism 112, a memory 113, an interrupt controller 114, and a timer 115. The access violation detection mechanism 112 monitors the accesses to the memory 113, and sends an error notification 116 to the interrupt controller 114 when there is an access violation. For the memory 113, an access privilege (READ privilege, WRITE privilege, or ERASE privilege) to each area of the memory 113 is set for each task, and the access violation detection mechanism 112 detects any accesses from a task not granted with the access privilege to the area, as an access violation. When an error notification 116 resultant of an access violation to the memory 113 is received, the interrupt controller 114 interrupts the CPU 111. The timer 115 provides the time to each of the units included in the CPU block 11.

The input/output block 12 includes an input/output device 121. The input/output device 121 includes an access violation detection mechanism 122 and a control register 123, and receives an access request for the control register 123 from the CPU 111 via the bus buffer 13. The access violation detection mechanism 122 monitors the accesses to the control register 123, and sends an error notification 124 to the interrupt controller 114 when there is an access violation. For the input/output block 12, an access privilege is set for each task, and the access violation detection mechanism 112 detects any accesses from a task not granted with the access privilege, as an access violation. When an error notification 124 resultant of the access violation to the control register 123 is received, the interrupt controller 114 interrupts the CPU 111.

The program for controlling the ECU is executed by the CPU 111, and an operating system (OS) causes the program to operate in units of a task that is a unit of the program. The OS is configured to switch tasks with the interrupts thereto disabled, in order to maintain consistency of the internal management information. The OS is also configured to saves current time (task switching time), when the OS switches the tasks.

The interrupt resultant of a notification from the access violation detection mechanism 122 in the input/output block 12 is handled as a non-maskable interrupt that enabled to be accepted even while interrupts are prohibited, and the time at which the interrupts has occurred is stored in the interrupt handling.

The OS determines whether there has been an access violation at the timing at which the interruption prohibition is lifted, and identifies the task having been executed at the time when the access violation has occurred, by comparing the time at which the task is switched with the time at which the violation has occurred.

Figure 2:
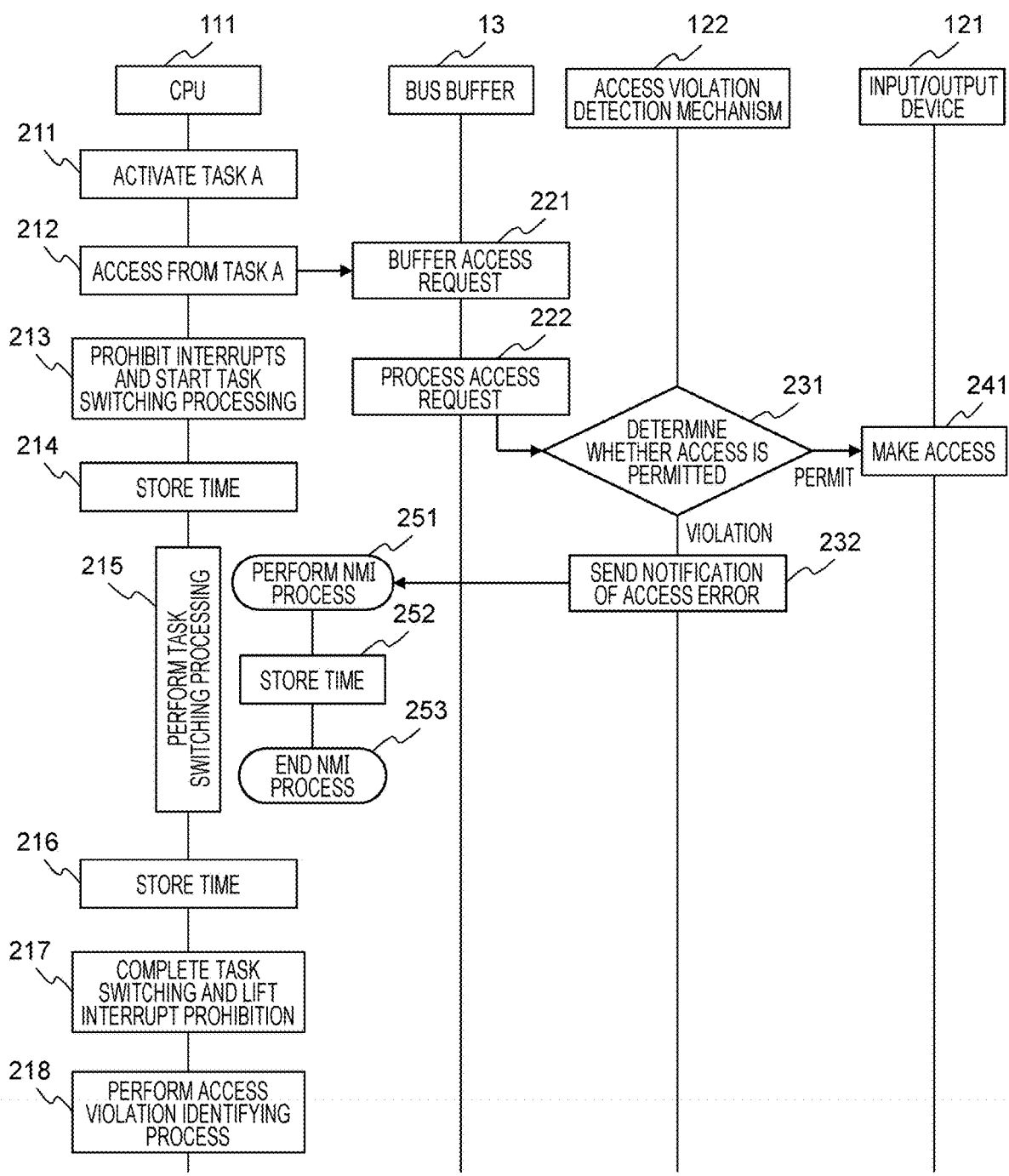
FIG. 2 is a sequence chart of execution of tasks and processing subsequent to a detection of a violation detection, in the OS.

FIG. 2 is a sequence chart of execution of tasks and processing subsequent to a detection of a violation detection, in the OS.

The OS manages execution of tasks in the CPU 111. In step 211, the CPU 111 activates a task A. In step 212, the task A makes an access to the input/output device 121. In step 221, the bus buffer 13 buffers the access request.

Meanwhile, in step 213, the CPU 111 (OS) prohibits interrupts, and starts task switching processing. In step 214, the CPU 111 stores the task switching start time, and in step 215, the CPU 111 executes the task switching processing.

In parallel with this process, processing of the buffered access request is started at the timing when the bus buffer 13 becomes available for the processing of the access request, in step 222.

In step 231, the access violation detection mechanism 122 determines whether the access to the input/output device 121 is permitted. If the access is permitted, the control register 123 is accessed in step 241. If the access constitutes a violation, the access violation detection mechanism 122 notifies the CPU 111 of an access error in step 232.

Once the access error is notified, although interrupts are prohibited, the CPU 111 receives the access error via an NMI (non-maskable interrupt) process in step 251, stores the time at which the access violation has occurred, in step 252, and ends the NMI process in step 253.

Upon completion of the task switching processing, the CPU 111 stores the task switching completion time in step 216, and the CPU 111 ends the task switching processing and lifts the interrupt prohibition, in step 217. An access violation identifying process in step 218 is then performed.

In step 218, the CPU 111 executes the access violation identifying process for identifying the task having caused the access violation, by comparing the task switching completion time with the time at which the access violation has occurred. Although the execution of the task identified as having caused the access violation may be continued, preferably, a predetermined process is applied to the task, e.g., stopping or restarting the task.

In a microcomputer with a settable interrupt acceptance level, the prohibition of interrupts may be imposed by changing the interrupt acceptance level. In such a configuration, a normal interrupt may be used instead of an NMI, by lowering the interrupt prohibition level of the os.

Next, other embodiments of the present invention will be described. In the other embodiments described below, elements that are different from those in the first embodiment will be mainly described, and description of the elements that are the same as those in the first embodiment will be omitted by giving the same reference numerals thereto.

Next, other embodiments of the present invention will be described. In other embodiments, elements and processes that are different from those in the first embodiment will be mainly described, and description of the elements and the processes that are the same as those in the first embodiment will be omitted.

Second Embodiment

Figure 3:
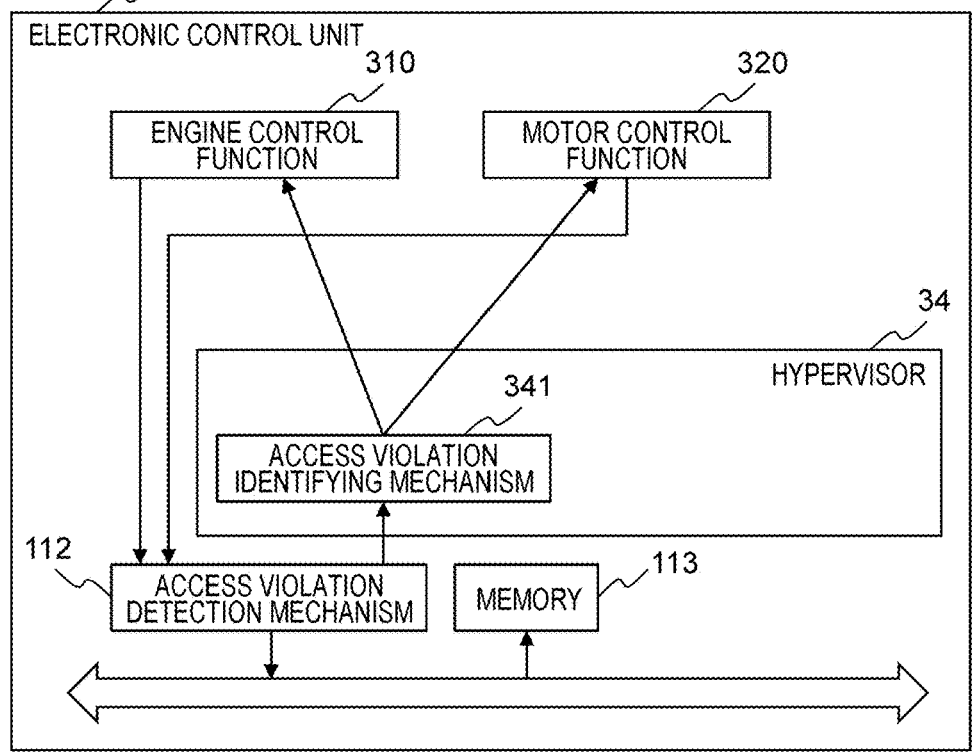
FIG. 3 is a configuration diagram of an electronic control unit according to a second embodiment.

FIG. 3 is a configuration diagram of an electronic control unit 1 according to a second embodiment.

The electronic control unit 1 is provided with a hypervisor 34 that manages operations of the OS so as to enable the tasks to be executed under the control of the OS. The hypervisor 34 has a function for accepting interrupts even while the interruptions of the OS are prohibited, and for interrupting the OS when the OS lifts the interrupt.

When there is an access to the memory 113 from an engine control function 310 or a motor control function 320, which are tasks, in violation, the access violation detection mechanism 112 detects the access violation, and notifies the hypervisor 34 of the access violation. An access violation identifying mechanism 341 in the hypervisor 34 executes the NMI processing (steps 251 to 253), which is executed by the CPU 111 in the first embodiment, and generates an interrupt for notifying the processor of the access violations, based on the detection result from the access violation detection mechanism 112. Therefore, it is not necessary to change the interrupt processing level for the CPU 111 managed by the OS.

Third Embodiment

In the first embodiment, when used is a high-speed microcomputer in which the time from when an access request is buffered (step 221) to when the access request is processed (step 222) is longer than the time required in the task switching processing in step 215 (that is, a microcomputer in which the processing time in the CPU 111 is significantly shorter than the delay in the bus buffer 13), the microcomputer may not be able to identify the task having been being executed when the access violation has occurred, correctly, merely by comparing the time of the task switching with the detection time of the access violation.

If it is the case, the delay time from when the access request is buffered (step 221) to when the access request is processed (step 222) is measured, and the time at which the task is switched is corrected by adding this measured delay time thereto before making a determination in the access violation process (step 218). The resultant time of the task switching is then compared with the time of the occurrence of the violation.

As described above, in the third embodiment, using the delay time introduced by the bus buffer 13 or the like, it is possible to identify the task having been executed at the time when the access violation has occurred, correctly, and to improve the safety of the control executed by the electronic control unit 1.

Fourth Embodiment

Figure 4:
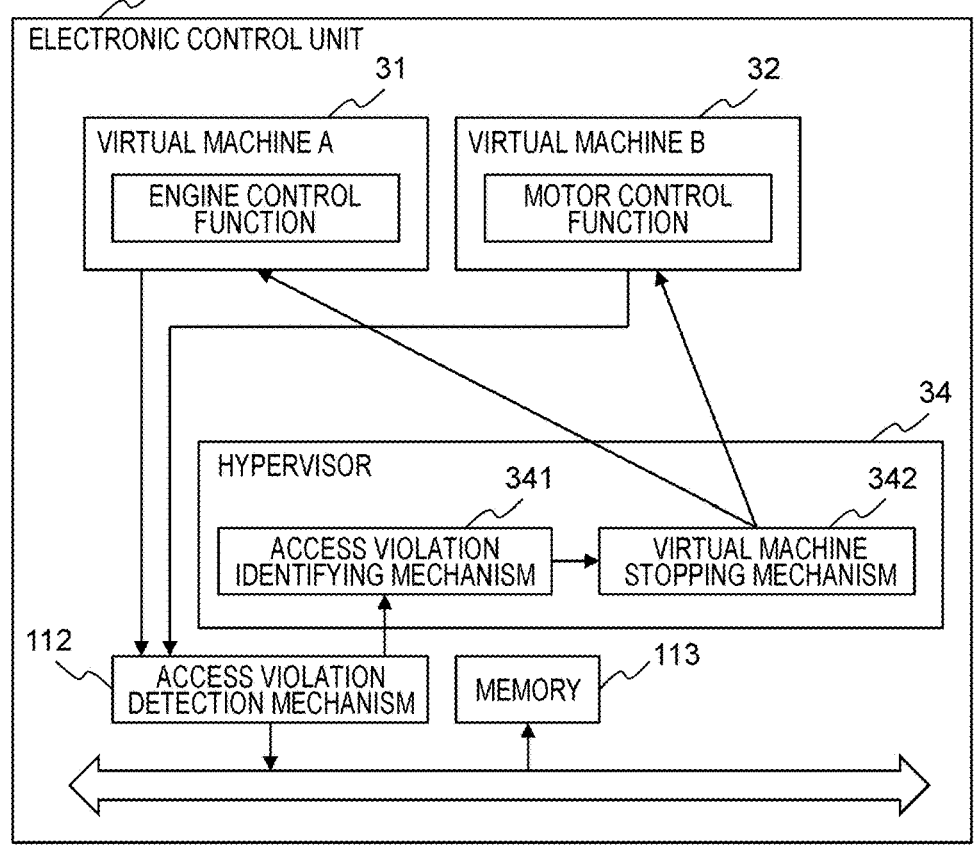
FIG. 4 is a configuration diagram of an electronic control unit according to a third embodiment.

FIG. 4 is a configuration diagram of an electronic control unit 1 according to a third embodiment. The electronic control unit 1 according to the third embodiment includes a hypervisor 34 that provides virtual machines each of which operates as an independent microcomputer.

In the electronic control unit 1, a virtual machine A31 and a virtual machine B32 that are managed by the hypervisor 34 are running. The hypervisor 34 stores the switching time of the virtual machines 31, 32. Each of these virtual machines 31, 32 makes an access to the memory 113. The access violation detection mechanism 112 monitors the access to the memory 113 from each of the virtual machines 31, 32, and sends an error notification to the access violation identifying mechanism 341 when there is an access violation. The access violation identifying mechanism 341 stores the detection time at which the access violation is detected, compares the switching time of the virtual machines 31, 32, stored by the hypervisor 34, with the detection time of the access violation, and identifies the virtual machine having resulted in the access violation.

Fifth Embodiment

With the electronic control unit 1 including the hypervisor 34 that provides virtual machines, it is possible to integrate the functions having been conventionally implemented using different ECUs, such as an engine control function and a motor control function. By resetting or stopping the virtual machine having caused an unauthorized access, it is possible to recover the normal operation of the electronic control unit 1 while keeping other normally operating virtual machines running.

It is assumed herein that, as illustrated in FIG. 4, the engine control function and the motor control function are implemented by the virtual machines 31, 32, respectively. Upon receiving an error notification, the access violation identifying mechanism 341 in the hypervisor 34 identifies the virtual machine having caused the access violation, issues an instruction to a virtual machine stopping mechanism 342, and stops and restarts the virtual machine resulted in in the access violation. When the virtual machine A31 is the cause of the access violation, only the virtual machine A31 may be restarted, and when the virtual machine B32 is the cause, the entire electronic control unit 1 may be restarted.

In the fifth embodiment, because the functions of the electronic control unit 1 are restricted by stopping the task having caused the access violation, even if a problem occurs in the engine control function, for example, it is possible to perform appropriate failsoft processing in accordance with the importance of the functions, while ensuring the safety by avoiding abnormal control, e.g., continuing the operation of the motor control function.

Sixth Embodiment

Figure 5:
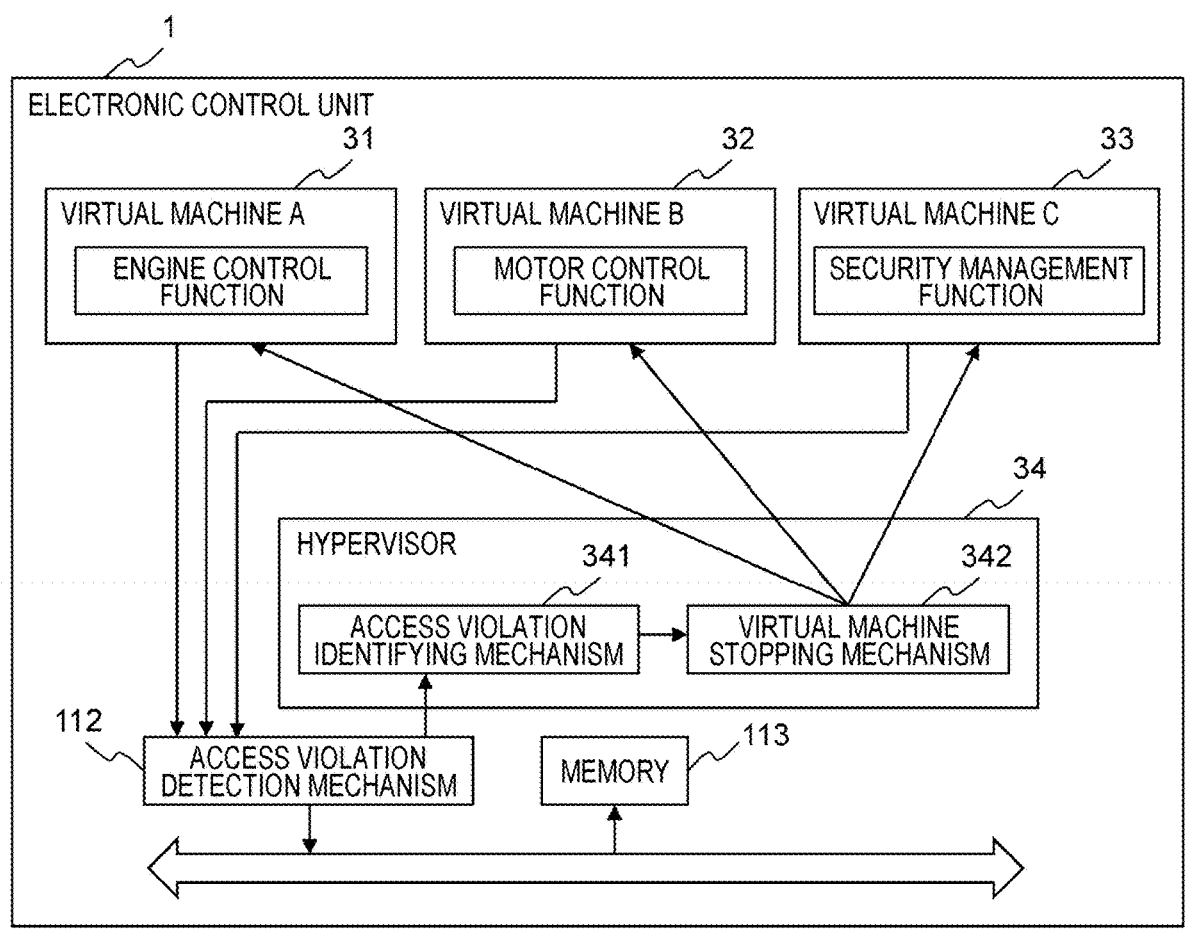
FIG. 5 is a configuration diagram of an electronic control unit according to a sixth embodiment.

FIG. 5 is a configuration diagram of an electronic control unit 1 according to a sixth embodiment. In the electronic control unit 1 according to the sixth embodiment, a virtual machine C33 that provides a security management function is running, in addition to the virtual machine A31 and the virtual machine B32. The virtual machine C33 is managed by the hypervisor 34, in the same manner as the virtual machine A31 and the virtual machine B32. If the virtual machine A31 or the virtual machine B32 is the cause of the access violation, only the virtual machine having caused the access violation is restarted; and if the virtual machine C33 providing the security management function is the cause of the unauthorized access, it is determined that the security violation has occurred, and the safety of the entire vehicle is ensured by stopping the entire electronic control unit 1 to take safety measures, or by notifying another electronic control unit of the unauthorized access.

In the sixth embodiment, by stopping or restarting a specified task, or notifying another process (another ECU) based on the task (virtual machine) having made an access violation, it is possible to implement appropriate failsoft processing, in accordance with the importance of the functions, while ensuring safety by restricting some or all of the functions of the electronic control unit 1.

Seventh Embodiment

Figure 6:
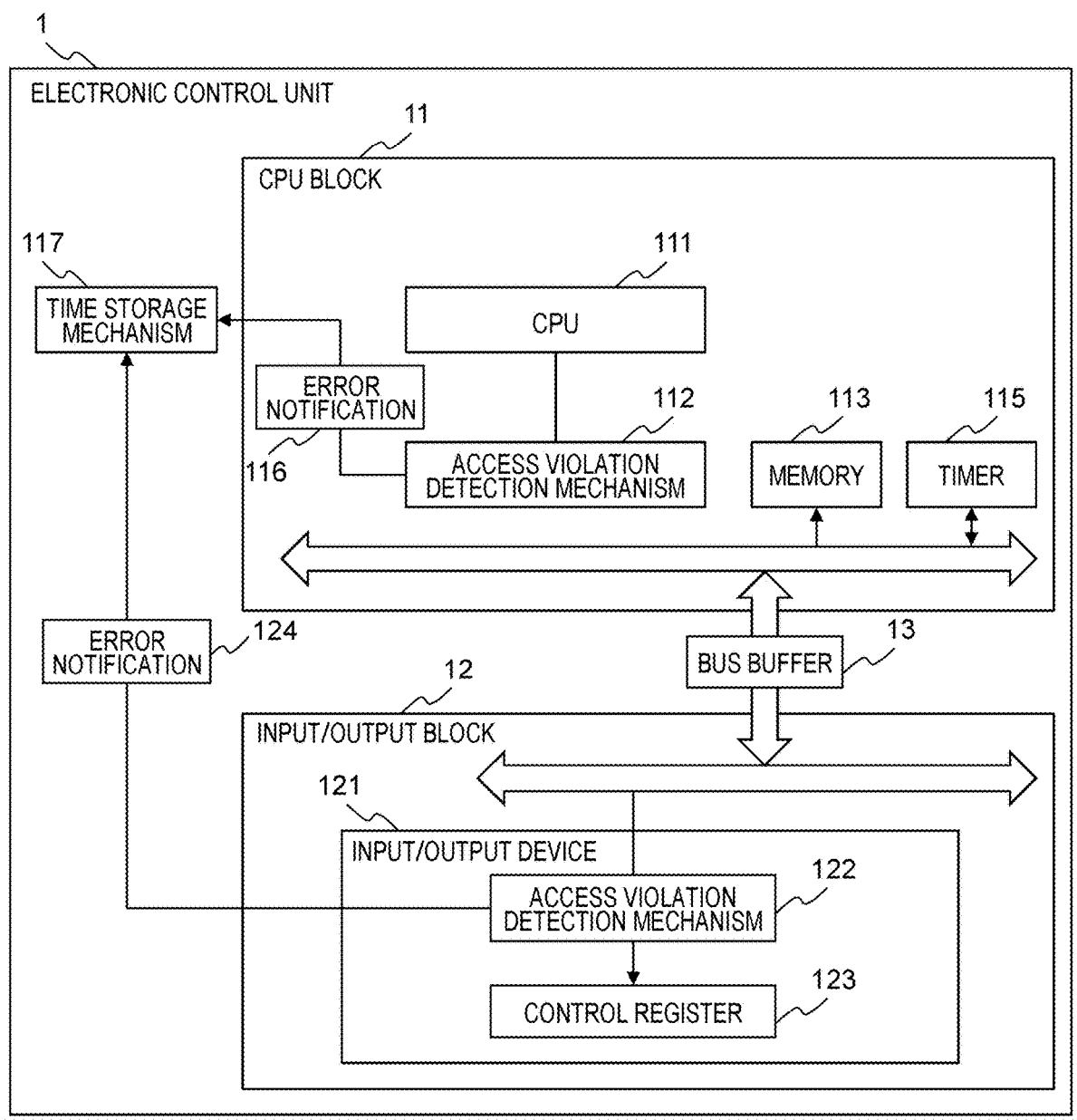
FIG. 6 is a configuration diagram of an electronic control unit according to a seventh embodiment.

FIG. 6 is a configuration diagram of an electronic control unit 1 according to a seventh embodiment. In the electronic control unit 1 according to the seventh embodiment, a dedicated circuit outside the CPU or another CPU core is used in acquiring the time of occurrence of an access violation.

In the electronic control unit 1, when the CPU 111 makes an unauthorized access to the memory 113, the access violation detection mechanism 112 sends an error notification 124 to a time retention mechanism 117. The time retention mechanism 117 acquires the time from the timer 115, and stores the time. The access violation detection mechanism 122 in the input/output block 12 also transmits an error notification 124 to the time retention mechanism 117. Note that the time retention mechanism 117 is merely required to have the function of acquiring from the timer 115 and retaining the time, and may be configured to transfer the time from the timer 115 to the memory 113 using DMA. When the microcomputer is a multi-core microcomputer including a plurality of CPUs, this processing may be performed by another CPU.

As described above, the electronic control unit according to the embodiment of the present invention includes: a processor (CPU 111) that executes a program; a memory 113 that is enabled to be accessed by the processor 111; an access violation detection mechanism 112 that monitors an access from the processor 111 to the memory 113; and a time storage mechanism (CPU 111, time retention mechanism 117) that stores time at which an access violation is detected by the access violation detection mechanism 112, in which: the processor 111 stores switching time at timing at which a task being executed is switched, the time storage mechanism stores detection time at which the access violation is detected; and the processor 111 identifies a task having caused the access violation by comparing the switching time and the detection time. Therefore, it is possible to determine the task having caused the privilege violation, correctly. Furthermore, in an ECU having a plurality of tasks, even when detection of an access privilege violation is delayed, it is possible to identify the task having caused the violation, and continue the processing of normal functions.

Note that the present invention is not limited to the embodiments described above, and includes various modifications and equivalent configurations, within the spirit of the appended claims. For example, the embodiments have been described in detail in order to facilitate understanding of the present invention, but the present invention is not necessarily limited to the configurations having all of the described elements. Furthermore, a part of the configuration according to one embodiment may be replaced with the configuration of another embodiment. The configuration according to one embodiment may additionally include the configuration according to another embodiment. In addition, a part of the configuration according to each of the embodiments may be added, deleted, or replaced with another configuration.

Furthermore, a part or the whole of the above-described configurations, functions, processing units, processing means, and the like may be implemented as hardware through designing of an integrated circuit, for example, or may be implemented as software, by causing a processor to parse and to execute a program for implementing the functions.

Information such as a program, a table, and a file for implementing these functions may be stored in a storage device such as a memory, a hard disk, and a solid state drive (SSD), or a recording medium such as an IC card, an SD card, and a DVD.

In addition, the control lines and the information lines considered to be necessary in the description are illustrated, and not all of the control lines and the information lines required in the implementation are illustrated. In practice, it may be considered that almost all of these configurations are connected to one another.

The invention claimed is:

1. An electronic control unit comprising:
a processor that executes a program;
a memory that is enabled to be accessed by the processor;
an access violation detection mechanism that monitors an access from the processor to the memory; and
a time storage mechanism that stores time at which an access violation is detected by the access violation detection mechanism, wherein
the processor stores switching time at timing at which a task being executed is switched,
the time storage mechanism stores detection time at which the access violation is detected, and
the processor identifies a task having caused the access violation by comparing the switching time and the detection time.

2. The electronic control unit according to claim 1, wherein
an access privilege to a storage area of the memory is set for each of a plurality of the tasks, and
the access violation detection mechanism monitors whether the task makes an access to the memory in accordance with the set access privilege, and notifies the processor of an access violation that is outside of the access privilege.

3. The electronic control unit according to claim 1, further comprising
an input/output device that is enabled to be accessed from the processor, wherein
the access violation detection mechanism monitors an access from the processor to the input/output device,
the time storage mechanism stores time at which an access violation to the input/output device is detected, and
the processor identifies a task having caused the access violation by comparing the switching time and the detection time.

4. The electronic control unit according to claim 1, wherein
the processor receives a notification of the access violation by an interrupt at a level that is enabled to be accepted even when interruption of the processor is prohibited.

5. The electronic control unit according to claim 1, wherein the time storage mechanism is provided separately from the processor.

6. The electronic control unit according to claim 1, wherein the processor has a hypervisor running, and the hypervisor generates an interrupt for notifying the processor of an access violation, in accordance with a detection result of the access violation detection mechanism.

7. The electronic control unit according to claim 6, wherein the hypervisor provides virtual machines by which tasks are executed, the time storage mechanism stores time at which the access violation is detected, and the processor identifies a virtual machine having caused the access violation and identifies a task being executed by the identified virtual machine as a task having caused the access violation by comparing the switching time and the detection time.

8. The electronic control unit according to claim 3, wherein the processor corrects the switching time based on buffer time until an access request to the input/output device is processed, and identifies the task having caused the access violation by comparing the corrected switching time and the detection time.

9. The electronic control unit according to claim 1, wherein the processor restricts functions of the electronic control unit by stopping the task having caused the access violation.

10. The electronic control unit according to claim 1, wherein, after the access violation is detected, the processor restricts a part or all of functions of the electronic control unit, depending on a task having caused the access violation.

11. An access control method in an electronic control unit, the electronic control unit including: a processor that executes a program; a memory that is enabled to be accessed by the processor; an access violation detection mechanism that monitors an access from the processor to the memory; and a time storage mechanism that stores detection time at which an access violation is detected by the access violation detection mechanism, the access control method comprising:

storing, by the processor, switching time at timing at which a task being executed is switched;

storing, by the time storage mechanism, time at which the access violation is detected; and identifying, by the processor, a task having caused the access violation by comparing the switching time and the detection time.

\* \* \* \* \*